United States Patent [19]

Mills et al.

[11] Patent Number: 4,674,548
[45] Date of Patent: Jun. 23, 1987

[54] ADJUSTABLE ROUTER

[75] Inventors: Charles J. Mills, Bellevue; Thomas W. Mott, Federal Way; Charles L. Willcox, Renton, all of Wash.

[73] Assignee: The Boeing Company, Seattle, Wash.

[21] Appl. No.: 813,526

[22] Filed: Dec. 26, 1985

[51] Int. Cl.$^4$ .............................................. B27C 5/10
[52] U.S. Cl. ................................. 144/134 D; 409/182
[58] Field of Search ...................... 409/180, 181, 182; 144/134 R, 134 D, 136 R, 136 C

[56] References Cited

U.S. PATENT DOCUMENTS

| | | |
|---|---|---|
| 2,625,860 | 1/1958 | Plester . |
| 2,635,655 | 4/1953 | Linstead . |
| 3,022,806 | 2/1962 | Johnston . |
| 3,212,541 | 10/1965 | Burrows et al. ................. 144/134 D |
| 3,476,161 | 11/1969 | Dunlap . |
| 3,628,579 | 12/1971 | Roche . |
| 3,893,372 | 7/1975 | Strakeljahn . |
| 3,913,447 | 10/1975 | Roche . |
| 3,955,607 | 5/1976 | Roche . |
| 4,044,805 | 8/1977 | Gronholz ............................ 409/182 |
| 4,051,880 | 10/1977 | Hestily . |
| 4,279,554 | 7/1981 | Seidenfaden . |
| 4,288,187 | 9/1981 | Wanner et al. . |
| 4,406,568 | 9/1983 | Rogers et al. . |
| 4,409,699 | 10/1983 | Moorhouse . |

Primary Examiner—W. D. Bray
Attorney, Agent, or Firm—Christensen, O'Connor, Johnson & Kindness

[57] ABSTRACT

A hand-held router is provided that includes a motor with a router bit mounted on the motor in driven relationship. A router head is attached to the motor an at least partially surrounds the router bit. A device for controlling the depth of cut of the router bit is mounted on said router head as is a device for adjusting a second parameter of the cut. In one embodiment, the second controlled parameter is the width of cut made by the router bit. Preferably, a guide block is also movably affixed to the cut width adjustment device and acts as a guide to maintain the uniformity of cut of the router bit. The guide block is adjustable to accommodate workpieces of different thickness. In a second embodiment, the second controlled parameter is the angle of the cut. The router head is adapted for receiving an angular adjustment plate that can be used to determine the angle of attack of the router bit on the workpiece. The angle adjustment plate can be utilized in conjunction with the device for adjusting cut depth to provide an accurate and customized trim for a workpiece of different materials, whether it be aluminum, some other metal or a nonmetallic composite material. In the preferred embodiment, a vacuum port is formed in the router head trailing the router bit and is adapted for coupling to a vacuum device. Particles being removed from a workpiece by the router bit are then transported through the vacuum port from the router head to the collection receptacle of the vacuum device for discard.

13 Claims, 7 Drawing Figures

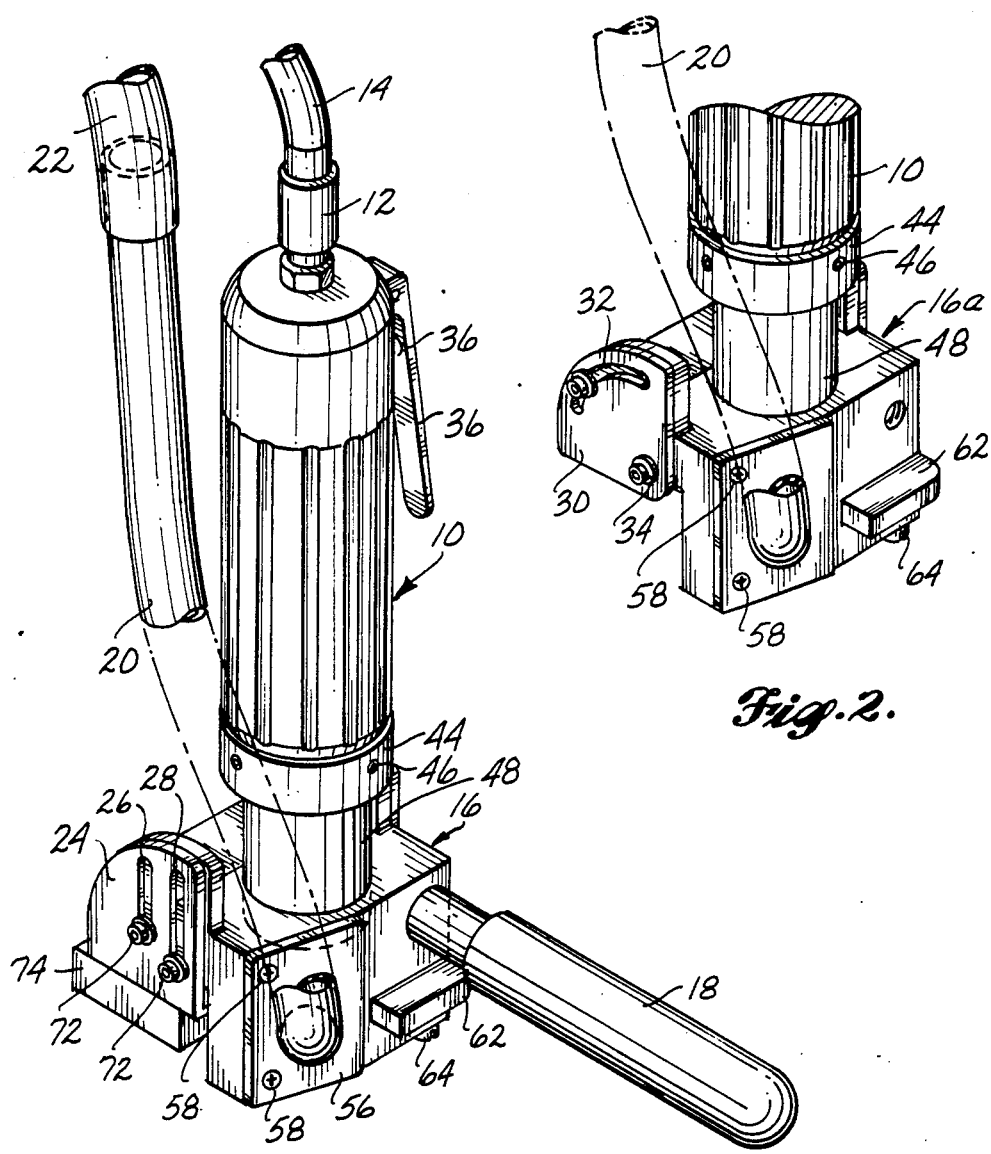

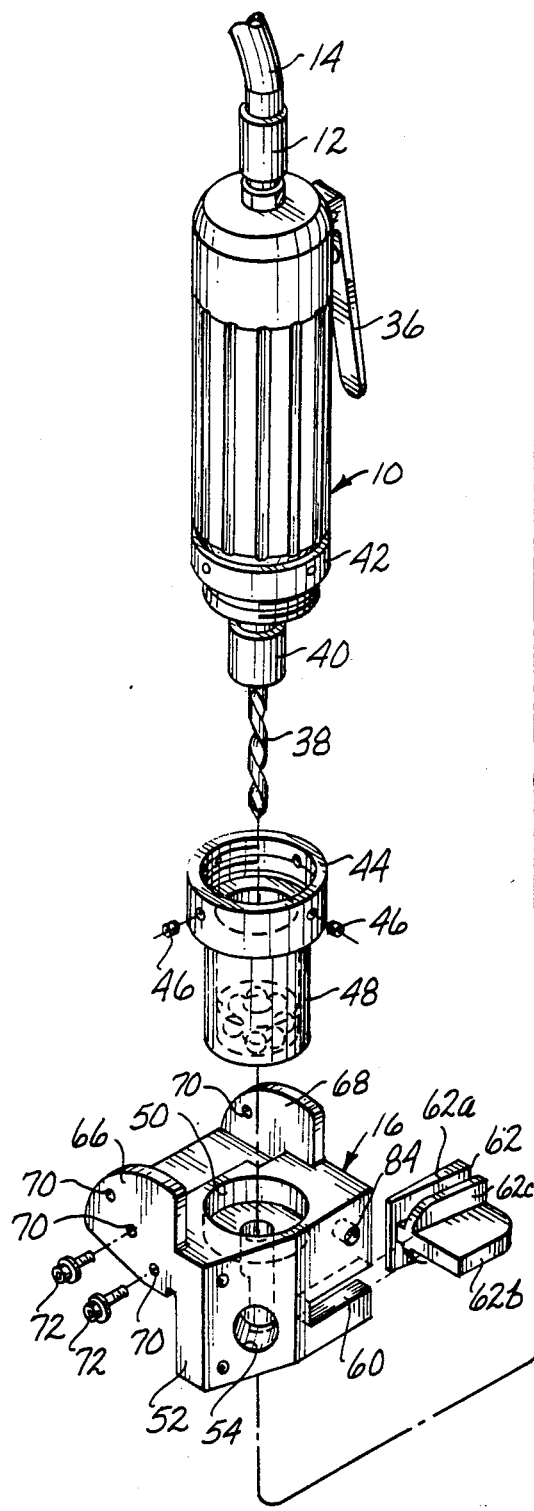
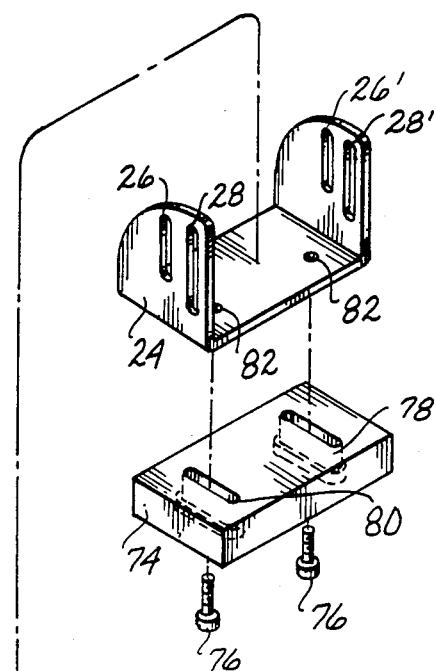
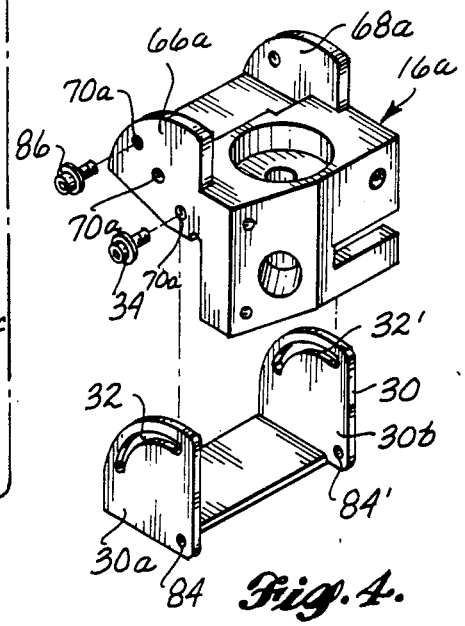
Fig. 3.
Fig. 4.

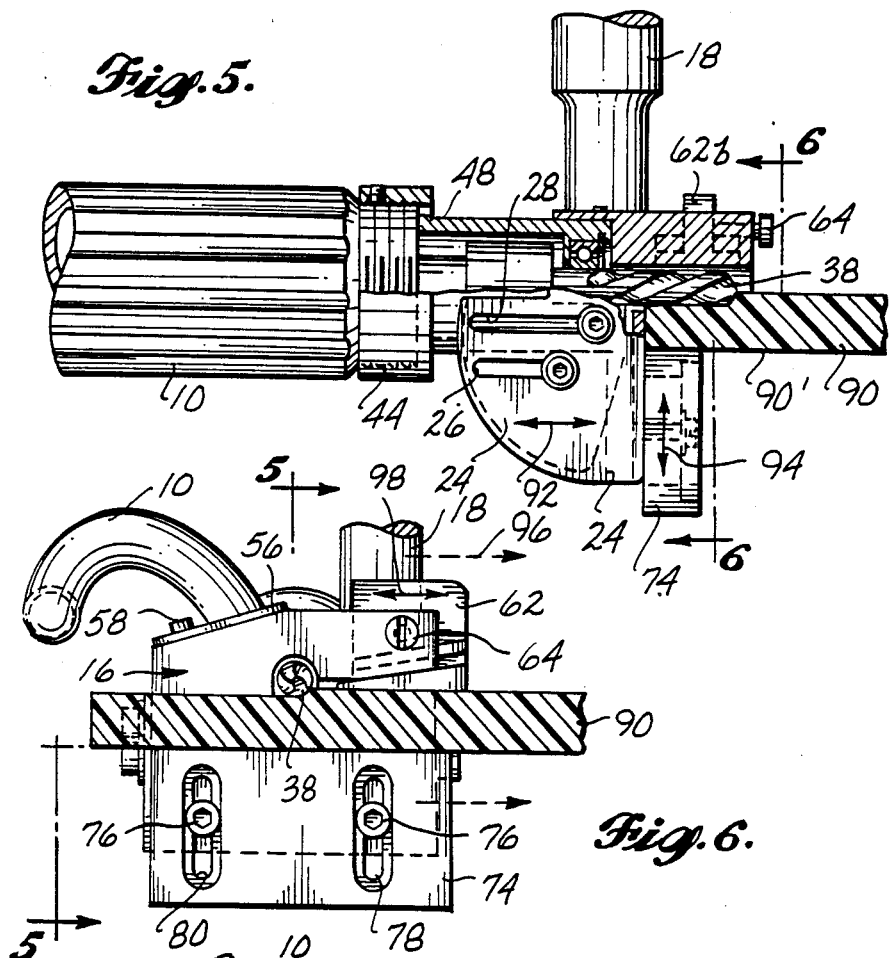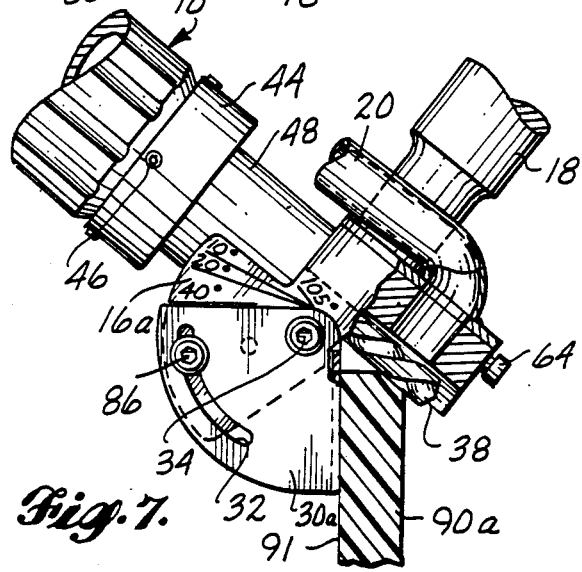

ADJUSTABLE ROUTER

BACKGROUND OF THE INVENTION

This invention relates to hand operated tools such as routers and more particularly relates to a router for making accurate edge cuts on the complex surfaces of a workpiece. The router is useful on many types of materials including nonmetallic composite materials.

In manufacturing large items such as aircraft, it is necessary to utilize many structural pieces that are large and of complex shape, for example double curves, etc. When it is necessary to finish some of these pieces, it is easier to use a hand operated tool rather than invest a great deal of capital in automated machine tools. While present routers can make angular edge cuts and step cuts in various materials, most of them require the use of separate guide blocks and related items in order to control the depth of cut and width of any trim cuts that are made. Therefore, it is desirable to have a hand-held router that can make both angle cuts and step cuts in a multitude of materials including nonmetallic composite materials and that is adjustable to determine the depth of cut and width of cut through the use of self-contained adjustment features of the router, thereby eliminating the need for separate router guides and clamps. It is also desirable to provide one edge trim router tool that is capable of making all of the cuts necessary to perform edge trimming, chamfering, step cutting and flat edge surface planing to the close tolerances required in aircraft construction.

SUMMARY OF THE INVENTION

In response to the desired features noted above, a hand-held router is provided that includes a self-contained guide means to control both depth of cut of the router bit and a second parameter of the cut being made by the router. An adjustment means is attachable to the router to provide control over the second parameter. One embodiment of the adjustment means determines the width of cut in order to produce step cuts of desired size and accuracy in a variety of materials. The adjustment means can alternatively include an adjustable foot that can be fixed in a variety of positions to provide for an angled cut by the router bit. Preferably, the router also includes a vacuum attachment that permits the coupling of a vacuum system to the router at a point adjacent the router bit in order to collect particles cut from a workpiece by the router to prevent contamination of the work area and to provide a clean environment for the operator of the router.

BRIEF DESCRIPTION OF THE DRAWINGS

The objects and advantages of the present invention will be better understood by those of ordinary skill in the art and others upon reading the ensuing specification when taken in conjunction with the appended drawings wherein:

FIG. 1 is an isometric view of one embodiment of a router made in accordance with the principles of the present invention;

FIG. 2 is an isometric view of the head portion of the router in FIG. 1 with an angle cut adjusting means made in accordance with the principles of the present invention attached thereto;

FIG. 3 is an exploded isometric view of the router shown in FIG. 1;

FIG. 4 is an exploded isometric view of the head portion of the router shown in FIG. 2;

FIG. 5 is a side elevational view in partial section along line 5—5 of FIG. 6 of the router shown in FIG. 1 making a step cut on a workpiece;

FIG. 6 is a front elevational view along line 6—6 of FIG. 5; and

FIG. 7 is a side elevational view with portions removed of the router shown in FIG. 2 making an angular cut on a workpiece.

DETAILED DESCRIPTION OF THE PREFERRED EMBODIMENT

One embodiment of a hand-held router made in accordance with the present invention is shown in FIG. 1. The router includes an air motor 10 which can be any suitable air motor The air motor 10 is coupled by a conventional coupling means 12 to an air hose 14 that leads to a source of compressed air (not shown) that powers the air motor. A router head generally designated as 16 and made in accordance with the principles of the present invention is attached to the air motor 10. The router head 16 has a handle 18 extending from it. The router head includes an outlet port that is connected to a vacuum tube 20 which in turn is coupled to vacuum means (not shown) by a flexible hose 22. The router shown in FIG. 1 includes a linear adjustment shoe 24 which will be described in greater detail later but which, in general, allows the width of cut to be made by the router to be adjusted over a range that is determined by the length of slots 26 and 28 formed in the linear adjustment shoe.

A second embodiment of the router made in accordance with the principles of the present invention is shown in FIG. 2. The router head 16a is essentially identical to the router head 16. However, an angular adjustment shoe 30 is mounted on the router head 16a in place of the linear adjustment shoe 24 that is shown in FIG. 1. A curved slot 32 is formed in the angular adjustment shoe and is utilized to define a range of angular movement of the angular adjustment shoe as it pivots about a machine screw 34 which acts both as a pivot point for the angular adjustment shoe and as an attachment of the shoe to the router head 16a. The operation of the angular adjustment shoe will be described in greater detail below as will the construction and operation of the router heads 16 and 16a.

Referring now to FIG. 3, the router shown in FIG. 1 is illustrated in exploded view to better illustrate the individual parts of the router. As was discussed earlier, the pictured air motor of has on its side a trigger lever 36 which is actuatable to control the flow of compressed air from the air hose 14 to operate the motor and thereby turn a router bit 38 mounted in a chuck 40 which forms a part of the router cone 42. A mounting collar 44 threadably engages a threaded portion of the router cone 42 and is locked in place by set screws 46 which threadably engage holes formed in the collar 44 and can be tightened to engage the threaded portion of the cone 42 to prevent rotation of the collar 44 with respect to the cone 42. A router bit shield or guard 48 extends from the cone 42 and surrounds the chuck 40 and the upper portion of the router bit 38 when the collar 44 is installed on the air motor 10. The guard 48 fits into a bore 50 formed in the router head 16 so as to mount the router head 16 on the drill motor. The router head 16 has a forward face portion 52 that extends a distance greater than the length of the router bit 38. An opening 54 through the forward face portion 52 of the router head provides a port to which the vacuum line 20 attaches by means of flange plate 56 which is secured by screws 58 to the forward face portion 52. In the illustrated embodiment, the vacuum line 20 is a rigid conduit, preferably of aluminum, however the vacuum line 20 can be any suitable conduit. The rear surface of the forward face portion 52 has a semicircular channel longitudinally formed therein which accepts the router bit 38 when the router head 16 is mounted on the drill motor 10. The relationship between the router bit 38 and the channel is best seen in FIG. 6.

An angled slot 60 is formed in one side of the router head 16 and is adapted to accept a cut depth adjustment block 62. The adjustment block 62 includes a wedge-shaped portion 62a from which extends handle portion 62b orthogonal to the wedge section 62a and a flange portion 62c which is parallel to the upper inclined surface of the wedge portion 62a and spaced from it. The cut depth adjustent shoe fits within the slot 60 formed in the forward face 52 of the router head 16. As best viewed in FIG. 6, it can be seen that the upper surface of the wedge-shaped portion abuts the lowermost surface of the righthand side of the forward face portion 52 of the router head and that the flange 62c fits within the slot 60 while the handle portion 62b extends past the router head so that it can be gripped by a user for movement of the adjustment shoe. While the router head 16 is made of metal, the adjustment shoe is preferably made of a rigid plastic material such as nylon, Teflon or Delrin to provide low friction movement of the shoe over the workpiece and also to provide for inexpensive replacement of the shoe should it wear after some period of use. The adjustment block 62 is held within the slot 60 by a suitable machine screw 64 which can be seen in FIGS. 5 and 6. The machine screw 64 threadably engages a hole formed in the router head such that the screw 64 can be tightened to engage the handle portion 62b of the cut depth adjustment block, holding it in the desired position. More details of the operation of the cut depth adjustment block will be described below.

The router head 16 includes two fan-shaped ear portions 66 and 68, respectively, located on opposite sides of the router head. The linear adjustment shoe 24 has tab portions 24a and 24b which overlie the ears 66 and 68. Holes 70 are formed in the ear portions 66 and 68 such that they cooperate with the slots 26 and 28 and 26' and 28' formed in the linear adjustment shoe 24. Machine screws 72 pass through the slots 26, 28, 26' and 28' and threadably engage the holes 70 to hold the linear adjustment shoe in the desired position. A snubber block 74 of essentially solid rectangular shape is positioned against the forward surface of the linear adjustment shoe 24 and is held in place by machine screws 76 that pass through slots 78 and 80, respectively, formed in the snubber block and then are threadably engaged in holes 82 formed in the linear adjustment shoe 24. The router head 16 also includes a threaded hole 84 which receives the handle 18.

The router head 16a pictured in FIG. 4 is identical to the router head 16 described above and illustrated in FIG. 3. FIG. 4 illustrates an alternate shoe, namely the angular adjustment shoe 30 which is also adapted to be mounted on the router head 16a. The angular adjustment shoe 30 has mounting tabs 30a and 30b which overlie the ears 66a and 68a of router head 16a. The angular adjustment shoe 30 has a hole 85 formed in the tab 38a and hole 85' formed in the tab 30b which overlie one of the holes 70a formed in the ears 66a and 68a, respectively. The machine screw 34 passes through the hole 84 or 84' and is threadably engaged with the hole 78 formed in the respective ear 66a or 68a of the router head 16a to hold the adjustment shoe in place and also to provide a pivot about which the adjustment shoe can move in order to allow angular position adjustment of the router head 16a with respect to the workpiece, as will be described later. The pivotal movement of linear adjustment shoe 30 is limited by a machine screw 86 that rides within the curved slot 32 or 32' formed in the tab portions 30a and 30b of the angular adjustment shoe 30 and threadably engages one of the holes 70a in the ear 66a or 68a of the router head.

Referring now to FIGS. 5 and 6, the operation of the hand-held router of the present invention is shown with the linear adjustment shoe 24 mounted on the router head 16 and the router being used to make a step cut in an edge of a workpiece 90. In operation, the tool is held so that the router bit 38 can make contact with the workpiece 90 so that the appropriate portion of the workpiece 90 can be removed by the router bit 38. The width of the cut being made by router bit 38 as viewed in FIG. 5 is determined by adjustment of the linear adjustment shoe 24 in a right/left direction as viewed in FIG. 5 and as indicated by arrow 92. By loosening the machine screws 72, the linear adjustment shoe 24 can be moved to the right or the left in order to allow linear adjustment shoe 24 to contact the workpiece 90 and hold the router bit 38 at the proper distance to provide the desired width of cut. The snubber block 74 is adjusted so that it underlies and abuts the undersurface 90' of the workpiece 90 to assist the operator in holding the router steady as the cut is made. The undersurface 90' of the workpiece acts as a guide riding on top of the snubber block 74 to ensure uniform depth of cut as the router moves across the workpiece. By loosening the screws 76, the snubber block 74 can be moved up and down as viewed in FIG. 5 and as indicated by arrows 94 to allow adjustment of the snubber block to accommodate various thicknesses of the material that makes up workpiece 90.

FIG. 6 illustrates the depth of cut adjustment of the router of the present invention. In FIG. 6 which is a view along line 6—6 of FIG. 5, an essentially end view of the router as it is making the step cut on workpiece 90 is shown. As viewed in FIG. 6, the router is being moved by the operator to the right as shown by the arrow 96 to cut away the desired portion of the workpiece 90 to produce the step cut. As can be seen in FIG. 6, the lowermost surface of the router head 16 to the left of router bit 38 is lower than the lowermost portion of the router head to the right of the router bit 38. The depth adjustment block 62 is mounted in slot 60 and the lowermost edge of the depth adjustment block 62 rides on the workpiece 90 ahead of the router bit. The depth of the cut to be made by the router bit is determined by the difference in height with respect to the router bit 38 of the router head portion that trails the router bit and the depth of cut block 62. Due to the angled orientation of the slot 60, movement of the cut depth adjustment block 62 to the right or left as shown by arrow 98 results in a change in the relative height of the lowermost surface of the cut depth adjustment block 62 with respect to the rest of the router head 16. In this manner, the depth of cut is adjusted to the desired level. In the illustrated embodiment, the maximum cut depth is accomplished when the cut depth adjustment block 62 is moved as far as possible to the right as viewed in FIG. 6, at which time the cut depth will be approximately one-half of the diameter of the router bit 38. The minimum cut depth occurs when the cut depth adjustment block is moved as far as possible to the left, making the lowermost edge of the left hand portion of the router head approximately the same height with respect to the router bit as the lowermost edge of the cut depth adjustment block 62. Since the cut depth adjustment block 62 rides on top of the workpiece 90 as the router does its work, it is desirable that the cut depth adjustment block 62 be made of a low friction material, such as Teflon or Nylon. Note should be taken of the positioning of the vacuum outlet 54 with respect to the router bit 38. Typically, the router bit will be rotating in a clockwise direction as viewed in FIG. 6 and the vacuum outlet 54 is positioned so that the chips being cut from the workpiece 90 are carried by the router bit towards the vacuum outlet 54 for most efficient operation of the vacuum system to remove all of the pieces of material removed from the workpiece 90 by the router cutting action.

FIG. 7 demonstrates the use of the router of the present invention in making a chamfer cut on the corner of a workpiece 90a. In FIG. 7, the angular adjustment shoe 30 is mounted on the router head 16a and is adjusted to provide approximately a 40° cut as indicated by the markings on the side of the ear 66a of the router head 16a. The angle is maintained by abutment of the angular adjustment shoe 30 with one surface 91 of the workpiece 90a as the router is moved across the workpiece to make the chamfer cut. As viewed in FIG. 7, the snubber block 74 is not typically used with the angular adjustment shoe 30, but is only used with the linear adjustment shoe 24. However, there may be situations in which it is desirable to use both an angular adjustment shoe and the snubber block and the illustrations herein are not intended to limit the configurations of the router of the present invention to such a degree.

In summary, therefore, a hand-held router tool has been described and illustrated which provides for making both angled and straight edge cuts on various workpiece materials and also permits the adjustment of both the depth of cut and width of cut to be made by the router through the use of elements of the router itself without the need for external and additional clamps, rolls, or guide members. Also, the router is easily adaptable from a straight cut to an angular cut by the simple change of a single component. The router also provides for a vacuum system to remove material chips from the workpiece area as the router does its job to provide both a clean and safe environment for the worker. The router has a variable thickness guide directly incorporated in it that permits the use of the router on various thicknesses of material without the need for additional straight edges or guides.

While the preferred embodiments of the invention have been descibed and illustrated herein, it will be understood by those of ordinary skill in the art and others that changes can be made to the illustrated and described embodiments while remaining within the spirit and scope of the present invention. Therefore, the invention should be defined solely with reference to the claims that follow.

The embodiments of the invention in which a property or priviledge is claimed are defined as follows:

1. In a hand-held router tool having a motor and a router bit mounted in driven relationship to said motor, the improvement comprising:
   a router head affixed to said motor and partially surrounding said bit;
   cut depth adjustment means movably mounted on said router head and operable to determine the depth of cut made by said router bit;
   cut width adjustment means mounted on said router head and operable to determine width of the cut made by said router bit; and
   a guide block movably mounted on said router head and adjustable to abut said workpiece at a surface opposite the surface upon which said router bit is acting, said guide block being adjustable to accommodate workpieces of different thicknesses.

2. The router of claim 1, wherein said cut width adjustment means includes a plate slidably mounted to said router head substantially orthogonal to said router bit, said plate being adjustable to abut an edge of said workpiece and including a mounting ear extending orthogonally from said plate, said mounting ear having at least one elongate slot formed therein substantially parallel to said router bit and a fastening means passing through said slot and engaging said router head to hold said mounting plate in the desired position.

3. The router of claim 2, wherein said guide block is slidably mounted to said plate, said guide block having a pair of slots parallel to one another formed through said blocks, fastening means passing through said slots and engaging said plate to hold said block to said plate, the motion of said plate being limited by the length of said slot.

4. In a hand-held rotor tool having a motor and a router bit mounted in driven relationship to said motor, the improvement comprising:
   a router head affixed to said motor and partially surrounding said bit, said router head including a first portion that leads said router bit as said router operates on said workpiece and a second portion that trails said router bit as said router works on said workpiece;
   cut depth adjustment means movably mounted on said router head and operable to determine the depth of cut made by said router bit, said cut depth adjustment means including a wedge slidably mounted in said first portion of said router head and movable with relation to said router head in a direction orthogonal to said router bit, the distance from the outside diameter of said router bit to a bottommost surface of said wedge varying in relation to the sliding movement of said wedge in said router head; and
   cut width adjustment means mounted on said router head and operable to determine the width of the cut made by said router bit.

5. The router of claim 4, further including locking means associated with said wedge for removably fixing the location of said wedge in said first portion of said router head.

6. The router head of claim 5, further including a vacuum port formed in the second portion of said router head and adapted to receive a vacuum line which in turn is adapted for connection to a vacuum means.

7. In a hand-held router having a motor and a router bit mounted in driven relationship on said motor, the improvement including:

a router head affixed to said motor and at least partially surrounding said router bit, said router head having a leading portion that leads said router bit as it operates on said workpiece and a trailing portion that trails said router bit as it acts on said workpiece;

angle adjustment means pivotally mounted to said router head and adjustable to determine the angle of attack of said router bit to a workpiece; and depth-of-cut adjustment means mounted on said router head and operable to determine the depth of cut of said router bit, said depth of cut adjustment means including a wedge slidably mounted in said leading portion of said router head, the depth of said router cut being determined by the position of said wedge within said leading portion of the router head.

8. The router of claim 7, further including a vacuum port formed in the trailing portion of said router head and adapted for connection to a vacuum source.

9. The router of claim 8, further including locking means associated with said depth of cut adjustment means for fixing the position of said wedge in said router head.

10. The router of claim 9, further including second locking means associated with said angular adjustment means for fixing the angle of attack of said router bit to said workpiece.

11. The router of claim 7, wherein said angle adjustment means includes a plate pivotally mounted to said router head, the angle of said plate with relation to said router bit being adjustable by pivotal motion of said plate with respect to said router head.

12. The router of claim 7, wherein said wedge is constructed of a plastic.

13. The router of claim 7, wherein said motor is an air motor.

* * * * *

UNITED STATES PATENT AND TRADEMARK OFFICE
CERTIFICATE OF CORRECTION

PATENT NO. : 4,674,548
DATED : June 23, 1987
INVENTOR(S) : Charles J. Mills et al.

It is certified that error appears in the above-identified patent and that said Letters Patent is hereby corrected as shown below:

| | |
|---|---|
| Abstract, line 3: | "an" should be --and-- |
| Column 2, line 17: | insert --such as one manufactured by and available from Dotco Air Motors, a division of Cooper Air Tools of Hicksville, Ohio." after "motor" |
| Column 2, line 18: | no new paragraph at "The air motor 10 . . ." |
| Column 2, line 51: | insert --happens to be an air motor-- after "motor" |
| Column 2, line 51: | delete "has" |
| Column 2, line 51: | insert --the type sold and manufactured by Dotco Air Motors having-- after "of" |
| Column 5, line 60: | "descibed" should be --described-- |
| Column 6, line 34: | "rotor" should be --router-- |

Signed and Sealed this

Fourth Day of October, 1988

Attest:

DONALD J. QUIGG

*Attesting Officer*   *Commissioner of Patents and Trademarks*